(12) United States Patent
Nomura

(10) Patent No.: US 11,999,163 B2
(45) Date of Patent: Jun. 4, 2024

(54) ADJUSTING METHOD FOR PRINTING APPARATUS, AND A PRINTING APPARATUS

(71) Applicant: SCREEN HOLDINGS CO., LTD., Kyoto (JP)

(72) Inventor: Seiya Nomura, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 0 days.

(21) Appl. No.: 17/767,660

(22) PCT Filed: Nov. 2, 2020

(86) PCT No.: PCT/JP2020/041087
§ 371 (c)(1),
(2) Date: May 5, 2022

(87) PCT Pub. No.: WO2022/091414
PCT Pub. Date: May 5, 2022

(65) Prior Publication Data
US 2024/0100822 A1  Mar. 28, 2024

(51) Int. Cl.
*B41J 2/045* (2006.01)
*B41J 29/393* (2006.01)

(52) U.S. Cl.
CPC ....... *B41J 2/04551* (2013.01); *B41J 2/04541* (2013.01); *B41J 2/0457* (2013.01);
(Continued)

(58) Field of Classification Search
CPC .. B41J 2/04551; B41J 2/04541; B41J 2/0457; B41J 2/04581; B41J 2/04588; B41J 29/393; B41J 2029/3935
See application file for complete search history.

(56) References Cited

U.S. PATENT DOCUMENTS

| 6,126,263 | A | 10/2000 | Hotomi et al. |
| 2006/0146086 | A1 | 7/2006 | Ou et al. |

(Continued)

FOREIGN PATENT DOCUMENTS

| JP | 2004-188942 A | 7/2004 |
| JP | 2004-284064 A | 10/2004 |

(Continued)

OTHER PUBLICATIONS

Japanese Notice of Reasons for Refusal issued in corresponding Japanese Patent Application No. 2019-174055, dated Apr. 18, 2023, with English translation.

(Continued)

*Primary Examiner* — Lisa Solomon
(74) *Attorney, Agent, or Firm* — Rimon P.C.

(57) ABSTRACT

To provide an adjusting method for a printing apparatus, and the printing apparatus, capable of appropriately adjusting drive voltages of heads even when printing conditions are changed, this invention can appropriately acquire adjusted voltages of the heads even when printing conditions are changed. That is, according to this invention, a construction is configured to change an adjustable range of head drive voltages with a printing mode. This invention acquires the adjustable range corresponding to the printing mode set by referring to a table T1. Consequently, the adjusted voltages of the heads can be determined within the adjustable range suited to each printing mode.

13 Claims, 6 Drawing Sheets

(52) U.S. Cl.
CPC ....... *B41J 2/04581* (2013.01); *B41J 2/04588* (2013.01); *B41J 29/393* (2013.01); *B41J 2029/3935* (2013.01)

(56) References Cited

U.S. PATENT DOCUMENTS

| | | | |
|---|---|---|---|
| 2007/0236523 | A1 | 10/2007 | Nishikori et al. |
| 2017/0282545 | A1* | 10/2017 | Muto ................... B41J 2/04581 |
| 2018/0201014 | A1 | 7/2018 | Ohnishi |
| 2019/0366711 | A1 | 12/2019 | Kayahara |

FOREIGN PATENT DOCUMENTS

| | | | |
|---|---|---|---|
| JP | 2007-276360 A | 10/2007 |
| JP | 2010-188632 A | 9/2010 |
| JP | 2015-066852 A | 4/2015 |
| JP | 2018-134771 A | 8/2018 |
| JP | 2019-209483 A | 12/2019 |
| WO | 2016/084582 A1 | 6/2016 |
| WO | 2017/038608 A1 | 3/2017 |

OTHER PUBLICATIONS

Japanese Decision to Grant a Patent issued in corresponding Japanese Patent Application No. 2019-174055, dated Jun. 23, 2023, with English translation.
International Search Report issued in corresponding International Patent Application No. PCT/JP2020/041087, dated Jan. 19, 2021.

* cited by examiner

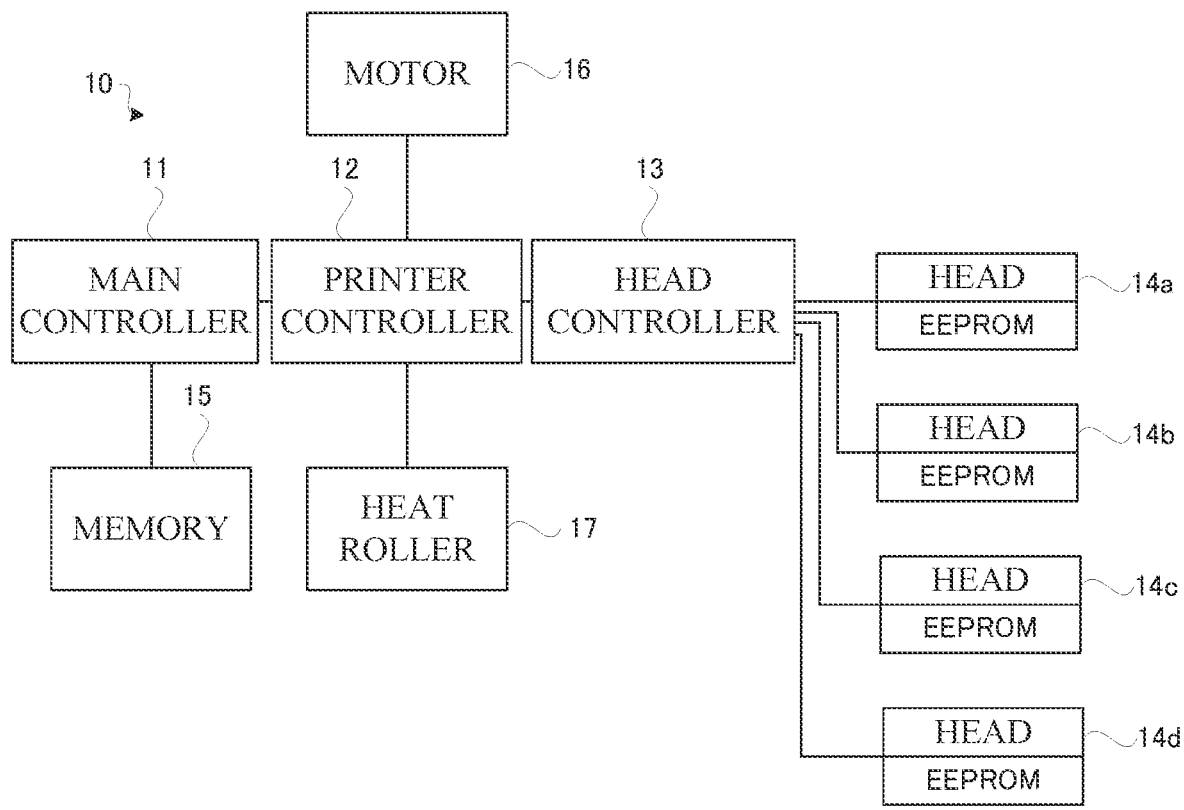

| | -5% | -4% | -3% | -2% | -1% | V0 | +1% | +2% | +3% | +4% | +5% |
|---|---|---|---|---|---|---|---|---|---|---|---|
| INK A | UNUSABLE | ADJUSTABLE RANGE | | | | | | | | UNUSABLE | |
| INK B | UNUSABLE | | ADJUSTABLE RANGE | | | | | | | UNUSABLE | |
| INK C | UNUSABLE | | ADJUSTABLE RANGE | | | | | | | | UNUSABLE |

T1

| | Smin | Smax |
|---|---|---|
| PRINTING MODE 1 (INK A) | -3% | +3% |
| PRINTING MODE 2 (INK B) | -2% | +3% |
| PRINTING MODE 3 (INK C) | -2% | +4% |

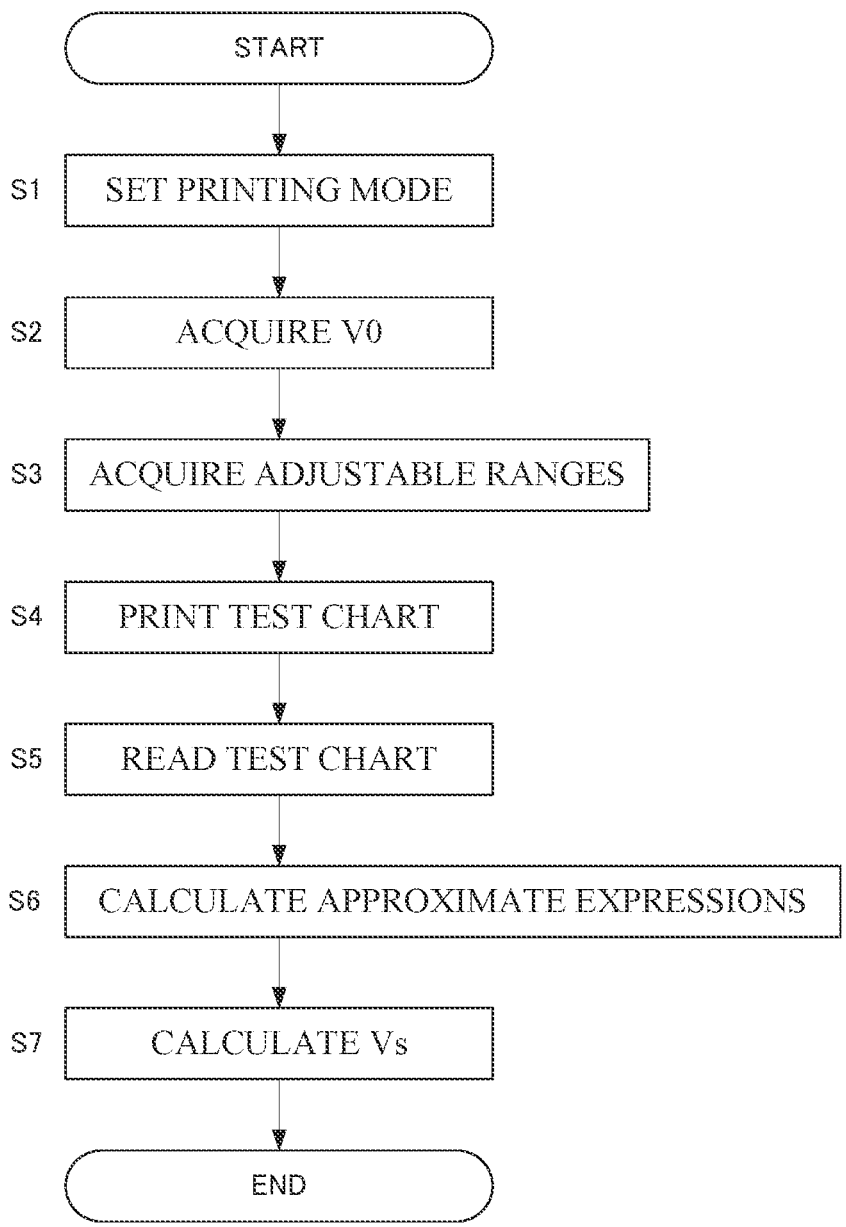

ADJUSTING METHOD FOR PRINTING APPARATUS, AND A PRINTING APPARATUS

CROSS REFERENCE

This application is the U.S. National Phase under 35 U.S.C. § 371 of International Application No. PCT/JP2020/041087, filed on Nov. 2, 2020, the entire contents of each are hereby incorporated by reference.

TECHNICAL FIELD

This invention relates to an adjusting method for printing apparatus, and a printing apparatus, and more particularly to an adjusting method for printing apparatus, and a printing apparatus, which can adjust printing density by changing head drive voltages.

In recent years, printing apparatus as inkjet printers have been developed. A printing apparatus of such construction has a plurality of heads, and performs printing by dispensing ink all at once from a plurality of nozzles arrayed on the heads.

Such heads of the printing apparatus are provided with control boards which control the heads. Each of these control boards has different electrical characteristics. Therefore, even if the same control is performed on the heads, some heads can easily dispense ink droplets, and others cannot easily do so. Thus, even when the heads are driven by a uniform drive voltage, variations will occur in printing results.

According to the conventional apparatus, a construction is provided for eliminating the variations due to the above control boards by adjusting the drive voltage of the heads. The method of adjusting the drive voltage in the conventional apparatus will be described. First, a reference voltage V0 is determined for driving each head. Then, before driving the heads, decisions are made on an upper limit voltage Vmax which is a maximum voltage permissible when increasing voltage from the reference voltage V0, and a lower limit voltage Vmin which is a minimum voltage permissible when decreasing voltage from the reference voltage V0. Then, for example, three test printings are carried out with different drive voltages on each head. The drive voltage for the first printing is the upper limit voltage Vmax, the drive voltage for the second printing is the reference voltage V0, and the drive voltage for the third printing is the lower limit voltage Vmin. The results of such test printings are called test charts.

A test chart in the above example has three patches of different densities printed for each head. The patch relating to the upper limit voltage Vmax is printed densest, and the patch relating to lower limit voltage Vmin palest. Based on these test charts, an approximate expression showing a relationship between printing density and drive voltage can be acquired. If a target density which is a proper density the heads should output has been determined, a drive voltage of the heads that will result in this target density can be determined based on the approximate expression. By performing such an adjustment of the drive voltage for each head, all printing densities may be adjusted to the target density regardless of the differences in the electrical characteristics of the control boards which drive the heads. When, after the adjustment, solid printing is attempted for the target density, for example, each head will complete the printing all in the same target density by being driven with the drive voltage corresponding to the target density. Note that, since there are differences in electrical characteristics among the control boards, the drive voltage of each head is usually different from those of the other heads.

PRIOR ART DOCUMENT

[Patent Document]
[Patent Document 1] Unexamined Patent Publication No. 2018-134771

SUMMARY OF INVENTION

Technical Problem

However, the conventional printing apparatus has an inconvenience caused by the fact that the upper limit voltage Vmax and lower limit voltage Vmin are determined uniformly.

The above-mentioned upper limit voltage Vmax and lower limit voltage Vmin are set to provide a voltage adjustable range of the heads. That is, the upper limit voltage Vmax and lower limit voltage Vmin must both provide drive voltages that assure normal printing. Assuming that the purpose of setting the upper limit voltage Vmax and lower limit voltage Vmin is to create an approximate expression, no approximate expression usable for adjustment of printing density would be possible when the upper limit voltage Vmax were set so high as to result in an impermissible level as printing quality. Such a situation is the same for the lower limit voltage Vmin.

The conventional construction allows the upper limit voltage Vmax and lower limit voltage Vmin to be shared between different printing conditions. Then, it has sometimes been a case that, even when a voltage adjustment is performed in certain printing conditions, a proper printing density cannot be obtained in other printing conditions. In an extreme case, a situation can arise where ink droplets are dispensed so that even test charts cannot be created.

This invention has been made having regard to the state of the art noted above, and its object is to provide an adjusting method for printing apparatus, and a printing apparatus, capable of appropriately adjusting the drive voltages of heads even when printing conditions are changed.

Solution to Problem

Inventor of this invention has acquired the following findings as a result of research. That is, even when an upper limit voltage and a lower limit voltage provide a voltage adjustable range of heads in certain printing conditions, the upper limit voltage and lower limit voltage do not necessarily fit in the voltage adjustable range of the heads. That is, according to the conventional construction, it is possible that the upper limit voltage and lower limit voltage become impermissible drive voltages when an attempt is made to perform printing with normal upper limit voltage and lower limit voltage. Even when test charts created with such inappropriate drive voltages, drive voltages corresponding to a target density cannot be acquired.

To fulfill the above object, this invention provides the following construction.

An adjusting method for a printing apparatus according to this invention executes printing by dispensing ink droplets from a plurality of nozzle groups to a printing medium, the method comprising a step of setting a printing mode concerning an adjustment of the nozzle groups; and a step of acquiring an adjustable range of drive voltages of the nozzle groups corresponding to the printing mode set based on a table of relationship between each printing mode and the adjustable range.

[Functions and effects] According to the above construction, the printing apparatus can appropriately adjust head drive voltages even when printing conditions are changed. That is, according to this invention, the construction is provided to change, with the printing modes, the adjustable ranges of nozzle group drive voltages. Further, according to this invention, the adjustable range corresponding to the printing mode set by referring to a table is acquired. Consequently, nozzle group drive voltages can be determined within the adjustable range suited for each printing mode.

It is more preferable that the above adjusting method for the printing apparatus comprises a step of determining an adjusted value of the drive voltage for each of the nozzle groups based on the adjustable range acquired.

[Functions and effects] The above construction indicates a more specific construction of this invention. By determining an adjusted value of the drive voltage for each of the nozzle groups based on the adjustable range acquired, printing density will reliably be made constant among the nozzle groups.

It is more preferable that the above adjusting method for the printing apparatus comprises a step of creating a test chart based on the adjustable range acquired.

[Functions and effects] The above construction indicates a more specific construction of this invention. With the test chart created based on the adjustable range acquired, the nozzle group drive voltages can be determined reliably based on the test chart.

It is more preferable that the above adjusting method for the printing apparatus comprises a step of acquiring a relationship between printing density and the drive voltages based on the test chart.

[Functions and effects] The above construction indicates a more specific construction of this invention. By acquiring a relationship between printing density and the drive voltages based on the test chart, the nozzle group drive voltages can be determined on knowledge of how the printing density of a subject nozzle group changes in response to changes of the drive voltages.

In the above adjusting method for the printing apparatus, it is more preferable that the printing mode corresponds to a type of ink.

[Functions and effects] The above construction indicates a more specific construction of this invention. Where the printing mode corresponds to a type of ink, the nozzle group drive voltages can be determined appropriately despite changes in the type of ink.

In the above adjusting method for the printing apparatus, it is more preferable that the printing mode corresponds to a purpose of using prints.

[Functions and effects] The above construction indicates a more specific construction of this invention. Where the printing mode corresponds to a purpose of using prints, the nozzle group drive voltages can be determined appropriately despite changes in the purpose of using prints.

In the above adjusting method for the printing apparatus, it is more preferable that the printing mode corresponds to a voltage waveform in time of driving the nozzle groups.

[Functions and effects] The above construction indicates a more specific construction of this invention. Where the printing mode corresponds to a voltage waveform, the nozzle group drive voltages can be determined appropriately despite changes in the voltage waveform.

In the above adjusting method for the printing apparatus, it is more preferable that the printing mode corresponds to a speed of printing.

[Functions and effects] The above construction indicates a more specific construction of this invention. Where the printing mode corresponds to a speed of printing, the nozzle group drive voltages can be determined appropriately despite changes in the speed of printing.

In the above adjusting method for the printing apparatus, it is more preferable that the printing mode corresponds to a temperature of the nozzle groups.

[Functions and effects] The above construction indicates a more specific construction of this invention. Where the printing mode corresponds to a temperature of the nozzle groups, the nozzle group drive voltages can be determined appropriately despite changes in the temperature of the nozzle groups.

In the above adjusting method for the printing apparatus, it is more preferable that the printing mode corresponds to viscosity of the ink.

[Functions and effects] The above construction indicates a more specific construction of this invention. Where the printing mode corresponds to viscosity of the ink, the nozzle group drive voltages can be determined appropriately despite use of inks of different viscosity.

To fulfill the above object, this invention provides the following construction.

A printing apparatus according to this invention for executing printing by dispensing ink droplets to a printing medium, the apparatus comprising nozzle groups having nozzles for dispensing the ink droplets, and executing printing by dispensing the ink droplets to the printing medium; a printing mode setter for setting printing modes concerning an adjustment of the nozzle groups; and an adjustable range setter for acquiring an adjustable range of drive voltages of the nozzle groups corresponding to the printing mode set, based on a table of relationship between each printing mode and the adjustable range.

[Functions and effects] According to the printing apparatus head drive voltages can be adjusted appropriately even when printing conditions are changed. That is, according to this invention, the construction is provided to change, with the printing modes, the adjustable ranges of nozzle group drive voltages. Further, according to this invention, the adjustable range corresponding to the printing mode set by referring to a table is acquired. Consequently, nozzle group drive voltages can be determined within the adjustable range suited for each printing mode.

It is more preferable that the above printing apparatus comprises a table memory for storing the table.

[Functions and effects] The above construction indicates a more specific construction of this invention. With a table memory for storing the table, the printing apparatus provided can operate with increased reliability by referring to the table.

Advantageous Effects of Invention

In a printing apparatus, according to this invention, head drive voltages can be adjusted appropriately even when printing conditions are changed. That is, according to this invention, the construction is provided to change, with the printing modes, the adjustable ranges of nozzle group drive voltages. Further, according to this invention, the adjustable range corresponding to the printing mode set by referring to a table is acquired. Consequently, nozzle group drive voltages can be determined within the adjustable range suited for each printing mode.

BRIEF DESCRIPTION OF THE DRAWINGS

FIG. 1 is a functional block diagram illustrating an overall construction of a printing apparatus according to an embodiment.

FIG. 2 shows a relationship between heads and reference voltages according to the embodiment.

FIG. 8 shows a table of relationship between the heads and adjusted voltages according to the embodiment.

FIG. 9 is a flow chart illustrating an operation of the printing apparatus concerning calculation of an adjusted voltage according to the embodiment.

DESCRIPTION OF EMBODIMENTS

Figures 3, 4, 5:
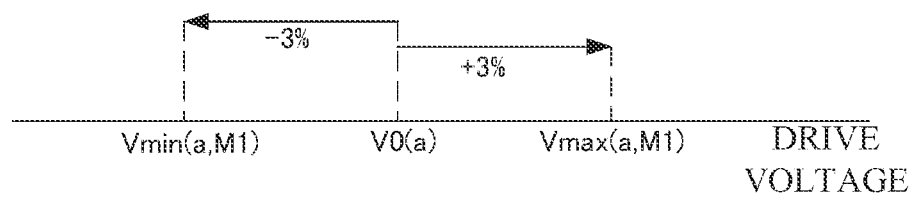
FIG. 3 shows adjustable ranges of head drive voltages according to the embodiment.
FIG. 4 shows a table of relationship between the adjustable ranges and printing modes stored in a memory according to the embodiment.
FIG. 5 shows a method of determining an upper limit and a lower limit of an adjustable range of head drive voltages using a lower limit set value and an upper limit set value according to the embodiment.

An embodiment of this invention will be described hereinafter with reference to the drawings. A printing apparatus 10 in the embodiment is constructed to include a plurality of inkjet heads of the piezo type. One example of printing media in this invention is paper (e.g. roll paper).

FIG. 1 is a functional block diagram illustrating the printing apparatus 10 according to this invention. As shown in FIG. 1, the printing apparatus 10 according to this invention includes a main controller 11 having a console, a printer controller 12 for controlling, en bloc, various components constituting the printing apparatus 10, ahead controller 13 for controlling the inkjet heads (hereinafter simply called heads), and heads 14a, 14b, 14c and 14d for dispensing ink droplets. The printer controller 12, in response to commands from the main controller 11, controls the head controller 13, a motor 16 for driving various rollers included in the printing apparatus 10, and a heat roller 17 for drying the printing medium. A memory 15 is a storage device for storing information concerning controls of the printing apparatus 10, and is accessible to the main controller 1. The main controller 11, printer controller 12 and head controller 13 are realized by processors such as CPUs and microcomputers. The main controller 11 corresponds to the printing mode setter and the adjustable range setter of this invention.

The heads 14a, 14b, 14c and 14d have a plurality of nozzles with openings for dispensing ink droplets, and the plurality of nozzles are controlled en bloc to realize flights of the ink droplets to the printing medium. An EEPROM is provided for each of the heads 14a, 14b, 14c and 14d, and a reference voltage V0 and so on described hereinafter are stored therein. Although only four heads are depicted in FIG. 1, the printing apparatus 10 according to this invention may include more heads. Specifically, the printing apparatus 10 may include a head unit with head arrays. The embodiment will be described particularly in relation to the four heads 14a, 14b, 14c and 14d shown in FIG. 1. Each of the heads 14a, 14b, 14c and 14d corresponds to the nozzle group of this invention.

These heads 14a, 14b, 14c and 14d have individual differences with regard to ease in dispensing ink droplets. The reference voltage V0 is obtained for each of the heads 14a, 14b, 14c and 14d in order to eliminate these individual differences. The reference voltages V0 are determined by measuring flight speeds of the ink droplets dispensed from the heads 14a, 14b, 14c and 14d. That is, the reference voltages V0 are determined to make the flight speeds of the ink droplets constant among the heads 14a, 14b, 14c and 14d. FIG. 2 shows a table of relationship between the heads 14a, 14b, 14c and 14d and the reference voltages V0. Reference voltages V0(a), V0(b), V0(c) and V0(d) are provided for the heads 14a, 14b, 14c and 14d, respectively. These reference voltages V0 are obtained before the heads are installed in the printing apparatus 10, and the EEPROMs provided for the heads 14a, 14b, 14c and 14d store information showing the reference voltages V0 relating to the heads, respectively.

Uniform printing may seem possible if the heads 14a, 14b, 14c and 14d perform printing under control that takes the reference voltages V0 into consideration. However, it is not the case in reality. Each of the heads 14a, 14b, 14c and 14d is provided with a control board for head control. Each of these control boards has different electrical characteristics. Consequently, in a state of the control boards electrically connected to the heads 14a, 14b, 14c and 14d, without an adjustment relating to the head drive voltages performed once again, variations will occur in printing results due to the differences in the electrical characteristics of the control boards.

Then, the construction according to this invention is configured to carry out an adjustment of the head drive voltages in two stages. The first stage of the adjustment is to acquire the reference voltages V0 described above. The second stage of the adjustment is to acquire adjusted voltages Vs, which will be described hereinafter. The adjusted voltages Vs are acquired based on the reference voltages V0, which are adjusted head drive voltages acquired upon completion of an adjusting operation of head drive voltages described with reference to FIGS. 2 to 7. The adjustment of the head drive voltages is an adjusting operation for enabling the heads 14a, 14b, 14c and 14d to perform printing without density variations. The adjusted voltages Vs are voltages close to the reference voltages V0, and can be reached by raising or lowering voltages somewhat from the reference voltages V0.

It is not that any voltages are accepted as the adjusted voltages Vs. When the adjusted voltages Vs are too high relative to the reference voltages V0, for example, unwanted satellites will occur in the ink droplets dispensed from the heads 14a, 14b, 14c and 14d, impairing the quality of printing. When the adjusted voltages Vs are too low relative to the reference voltages V0, for example, ink droplets will not be dispensed from the heads 14a, 14b, 14c and 14d, impairing the quality of printing. Thus, the adjustment of the head drive voltages is subject to voltage ranges for allowing adjustment. Such voltage ranges will be called the adjustable ranges. The adjustable ranges include the above reference voltages V0.

FIG. 3 shows the adjustable ranges of the head drive voltages. When a certain ink A among plural types of inks is used for printing, the adjustable range of head drive voltages is, for example, a range between a lower limit to which the reference voltage V0 is lowered by 3% and an upper limit to which the reference voltage V0 is raised by 3%. In FIG. 3, the lower limit of this range is indicated −3%, and the upper limit +3%. This range is determined based on results of printing obtained by actually operating the heads while changing the drive voltages. The quality of printing is found permissible if the head drive voltages are at least within this adjustable range.

Caution is required when the type of ink is changed since it entails a change in the adjustable range of head drive voltages. One of the reasons for such a change is that viscosity changes with the type of ink. High viscosity of ink makes the ink relatively difficult to be dispensed from the heads, and it is necessary to increase the head drive voltage accordingly. Conversely, low viscosity of ink makes the ink relatively easy to be dispensed from the heads, and it is necessary to decrease the head drive voltage accordingly.

When a certain ink B is used in printing, the adjustable range of head drive voltages is, for example, a range between a lower limit to which the reference voltage V0 is lowered by 2% and an upper limit to which the reference voltage V0 is raised by 3%. In FIG. 3, the lower limit of this range is indicated −2%, and the upper limit +3%. The quality of printing is found permissible if the head drive voltages are at least within this adjustable range.

When a certain ink C is used in printing, the adjustable range of head drive voltages is, for example, a range between a lower limit to which the reference voltage V0 is lowered by 2% and an upper limit to which the reference voltage V0 is raised by 4%. In FIG. 3, the lower limit of this range is indicated −2%, and the upper limit +4%. The quality of printing is found permissible if the head drive voltages are at least within this adjustable range. In the printing apparatus 10 according to this invention, the construction provided takes into consideration variations of the adjustable range of the head drive voltages caused by such differences of the inks. Generally, adjustable ranges of head drive voltages are different from one another according to available ink types. Although three types of inks are shown in FIG. 3, it is a result of illustrating the three types among available inks.

FIG. 4 illustrates a table T1 of relationship between adjustable ranges and printing modes stored in the memory 15. A printing mode 1 corresponds to a printing mode using ink A, and a printing mode 2 corresponds to a printing mode using ink B. A printing mode 3 corresponds to a printing mode using ink C. The printing mode 1 in table T1 has correlated thereto a value showing the lower limit of the adjustable range of head drive voltages, and a value showing the upper limit of the adjustable range of head drive voltages. The value showing the lower limit, specifically, is a value showing −3% illustrated in FIG. 3, which will be called lower limit set value Smin. The value showing the upper limit, specifically, is a value showing +3% illustrated in FIG. 3, which will be called upper limit set value Smax.

The printing mode 2 in table T1 has correlated thereto a value showing the lower limit of the adjustable range of head drive voltages, and a value showing the upper limit of the adjustable range of head drive voltages. The lower limit set value Smin for the printing mode 2 is a value showing −2%, and the upper limit set value Smax is a value showing +3%.

Similarly, the printing mode 3 in table T1 has correlated thereto a value showing the lower limit of the adjustable range of head drive voltages, and a value showing the upper limit of the adjustable range of head drive voltages. The lower limit set value Smin for the printing mode 3 is a value showing −2%, and the upper limit set value Smax is a value showing +4%.

FIG. 5 illustrates a method of determining an upper limit and a lower limit of the adjustable range of head drive voltages by using the above lower limit set value Smin and upper limit set value Smax. When it is necessary to determine the range concerning the head 14a, the main controller 11 reads the table T1 stored in the memory 15 and the reference voltage V0(a) relating to the head 14a and stored in the EEPROM provided for the head 14a, and applies the lower limit set value Smin and upper limit set value Smax to the reference voltage V0(a).

That is, when the adjustable range of the drive voltages of the head 14a in the printing mode 1 is to be determined, as shown in FIG. 5, the main controller 11 obtains the lower limit of the adjustable range of drive voltages by reading the lower limit set value Smin relating to the printing mode 1 in table T1, and making the lower limit set value Smin act on the reference voltage V0(a). The lower limit is a value corresponding to the reference voltage V0(a) lowered by 3% as indicated by the lower limit set value Smin. Since this value is a value concerning the head 14a and printing mode 1, it will hereinafter be called lower limit voltage Vmin (a, M1). The main controller 11 also obtains the upper limit of the adjustable range of drive voltages by reading the upper limit set value Smax relating to the printing mode 1 in table T1, and making the upper limit set value Smax act on the reference voltage V0(a). The upper limit is a value corresponding to the reference voltage V0(a) raised by 3% as indicated by the upper limit set value Smax. Since this value is a value concerning the head 14a and printing mode 1, it will hereinafter be called upper limit voltage Vmax (a, M1).

Figure 6:
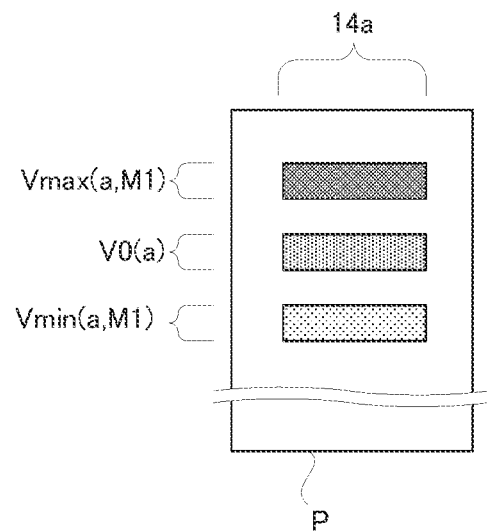
FIG. 6 shows results of actual printing using the heads in a predetermined printing mode according to the embodiment.

FIG. 6 shows results of actual printing done using the head 14a in the printing mode 1. The ink used at this time is ink A relating to the printing mode 1, for example. Printed on a printing medium P are a patch printed when the head drive voltage is made the upper limit voltage Vmax (a, M1) of the adjustable range, a patch printed when the head drive voltage is made the reference voltage V0(a), and a patch printed when the head drive voltage is made the lower limit voltage Vmin (a, M1) of the adjustable range. As shown in FIG. 6, the patch relating to the upper limit voltage Vmax (a, M1) is printed densest, and the patch relating to the lower limit voltage Vmin (a, M1) is printed palest. And the patch relating to the reference voltage V0(a) is printed in middle density between the above two patches. Thus, the printing results of the respective patches printed on the printing medium P constitute a test chart. The test chart can be read with a scanner to provide the printing density of each patch.

Figure 7:
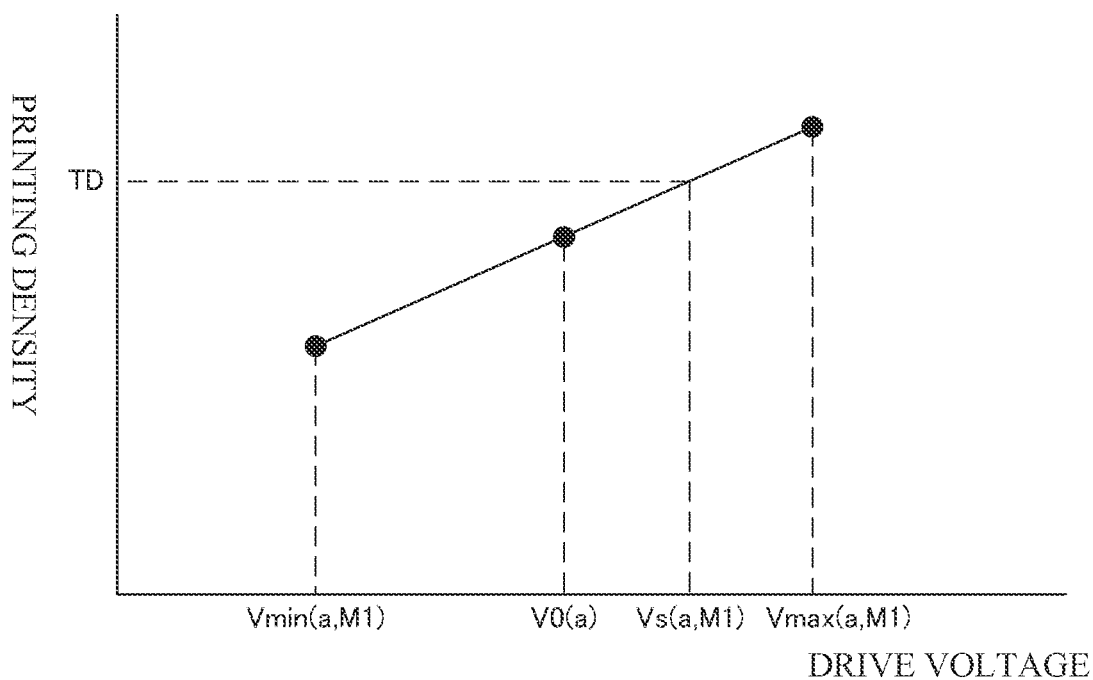
FIG. 7 shows a correlation between head drive voltage and printing density in each patch in a test chart according to the embodiment.

FIG. 7 shows a correlation between the printing density and the head drive voltage of each patch in the test chart. In the graph, the patch concerning the lower limit voltage Vmin (a, M1) is printed with the lowest voltage and also has low printing density. And the patch concerning the upper limit voltage Vmax (a, M1) is printed with the highest voltage and also has high printing density. The patch concerning the reference voltage V0(a) has intermediate values of voltage and printing density. These three points in the graph can be used to obtain an approximate expression showing a correlation between the head drive voltage and printing density. The approximate expression in FIG. 7 is a linear expression.

Since this approximate expression can be used in the adjustment of the head drive voltages, and this aspect will be described. Assume that the head 14a has difficulty in dispensing ink droplets compared with the other heads 14b, 14c and 14d. This difficulty in dispensing ink droplets is, for example, due to differences in the electrical characteristics concerning head control of the control boards provided for the respective heads 14a, 14b, 14c and 14d. Therefore, in order for the head 14a to be in a state of average ink droplet dispensation, it is necessary to control the head 14a by a voltage higher than the reference voltage V0(a). How much the voltage has to be increased from the reference voltage V0(a) specifically is derived from the approximate expression illustrated in FIG. 7. Target density TD shown in FIG. 7 is determined by performing printing which uses ink A and drives the heads 14a, 14b, 14c and 14d with the reference voltages V0(a), V0(b), V0(c) and V0(d), respectively, thereby to acquire patches as shown in FIG. 6, then reading these patches with a scanner, measuring the printing densities of the respective patches, and averaging the printing densities obtained. Since the head 14a is a head that cannot dispense ink droplets easily, the printing density of the patch printed when driven by the reference voltage V0(a) becomes paler than the target density TD. The drive voltage obtained when target density TD is substituted into the approximate expression makes the drive voltage corresponding to the target density TD for the head 14a. The drive voltage obtained in this way will be called adjusted voltage Vs (a, M1) meaning the drive voltage after adjustment.

Adjusted voltages can also be obtained for the heads 14b, 14c and 14d by using the method illustrated in FIGS. 2 to 7. The adjusted voltages have values peculiar to the heads 14a, 14b, 14c and 14d, which are Vs (a, M1), Vs (b, M1), Vs (c, M1) and Vs (d, M1), respectively.

FIG. 8 shows a table T2 of relationship between the heads 14a, 14b, 14c and 14d, and the adjusted voltages Vs (a, M1), Vs (b, M1), Vs (c, M1) and Vs (d, M1). When printing is performed referring to this table T2, uniform printing is attained in spite of the differences in electrical characteristics regarding head control of the control boards provided for the respective heads 14a, 14b, 14c and 14d. Table T2 is stored in the memory 15 and, in the case of execution of printing, is read by the main controller 11 for use in the printing. Specifically, in the case of execution of printing (product printing) of desired characters or the graphics, the heads 14a, 14b, 14c and 14d will be operated with the head drive voltages set to the adjusted voltages Vs (a, M1), Vs (b, M1), Vs (c, M1) and Vs (d, M1).

When the printing modes are changed, the adjusted voltages for the heads 14a, 14b, 14c and 14d will be different from the above Vs (a, M1), Vs (b, M1), Vs (c, M1) and Vs (d, M1). When printing is done with ink B in the printing mode 2, the main controller 11 operates by reading from the memory 15 a table of adjusted voltages Vs (a, M2), Vs (b, M2), Vs (c, M2) and Vs (d, M2) relating to the heads 14a, 14b, 14c and 14d and printing mode 2, which table is different from table T2. Thus, the memory 15 stores tables similar to table T2 illustrated in FIG. 8 and corresponding in number to the printing modes, and the main controller 11 operates referring to a table relating to a designated current printing mode. Each table can be created by the method illustrated in FIGS. 2 to 7.

Next, description will be made of an operation of the printing apparatus 10 regarding the calculation of adjusted voltages Vs with reference to the flow chart of FIG. 9.

<Printing Mode Setting Step S1>
A type of ink used by the user for printing is selected through the console connected to the main controller 11. This operation means setting of a printing mode.

<V0 Acquiring Step S2>
The main controller 11 accesses the EEPROM provided for each of the heads 14a, 14b, 14c and 14d, and acquires reference voltages V0(a), V0b), V0(c) and V0(d) corresponding to the respective heads 14a, 14b, 14c and 14d.

<Voltage Adjustable Range Acquiring Step S3>
The main controller 11 acquires the lower limit set value Smin and upper limit set value Smax corresponding to the printing mode set with reference to table T1. Then, the main controller 11 makes the lower limit set value Smin and upper limit set value Smax act on the reference voltages V0(a), V0(b), V0(c) and V0(d) to calculate the lower limit voltage Vmin and upper limit voltage Vmax for each of the heads 14a, 14b, 14c and 14d.

<Test Chart Printing Step S4>
The main controller 11 controls the printer controller 12 and head controller 13 to print a test chart relating to each of the heads 14a, 14b, 14c and 14d. Although the test chart in FIG. 6 was only about the head 14a and therefore the patches were only three, in this description of operation, three patches are printed for each of the four heads 14a, 14b, 14c and 14d. Consequently, the test chart printed now will include patches in a 3×4 two-dimensional matrix form.

<Test Chart Reading Step S5>
The printed test chart is read with a scanner. The printing density of each patch is measured by subsequent image analysis. The scanner may be the in-line type included in the printing apparatus 10 but not shown, or may be the off-line type separate from the printing apparatus 10.

<Approximate Expression Calculating Step S6>
A computer for analysis or the main controller 11 calculates an approximate expression showing a relationship between printing density and drive voltage in the patch relating to each of the heads 14a, 14b, 14c and 14d.

<Vs Calculating Step S7>
The computer for analysis or the main controller 11 calculates an adjusted voltage Vs based on the approximate expression and target density TD for each of the heads 14a, 14b, 14c and 14d. The adjusted voltage Vs is stored in the memory 15 as table T2 related to each of the heads 14a, 14b, 14c and 14d and printing modes. Table T2 is referred to in order to remove variations at the time of printing to follow.

According to this invention as described above, the printing apparatus 10 can appropriately acquire adjusted voltages Vs for the heads 14a, 14b, 14c and 14d even when printing conditions are changed. That is, according to this invention, the construction is provided to change, with the printing modes, the adjustable ranges of head drive voltages of the heads 14a, 14b, 14c and 14d. Further, according to this invention, the adjustable range corresponding to the printing mode set by referring to table T1 is acquired. Consequently, adjusted voltages Vs of the heads 14a 14b, 14c and 14d can be determined within the adjustable range suited for each printing mode.

This invention is not limited to the construction of the foregoing embodiment, but may be modified as follows:

(1) In the foregoing embodiment, no reference has been made to when adjusted voltage Vs is less than the lower limit voltage Vmin, or when adjusted voltage Vs exceeds the upper limit voltage Vmax. The computer for analysis or the main controller 11 can be constructed to deal with such cases.

Figure 10:
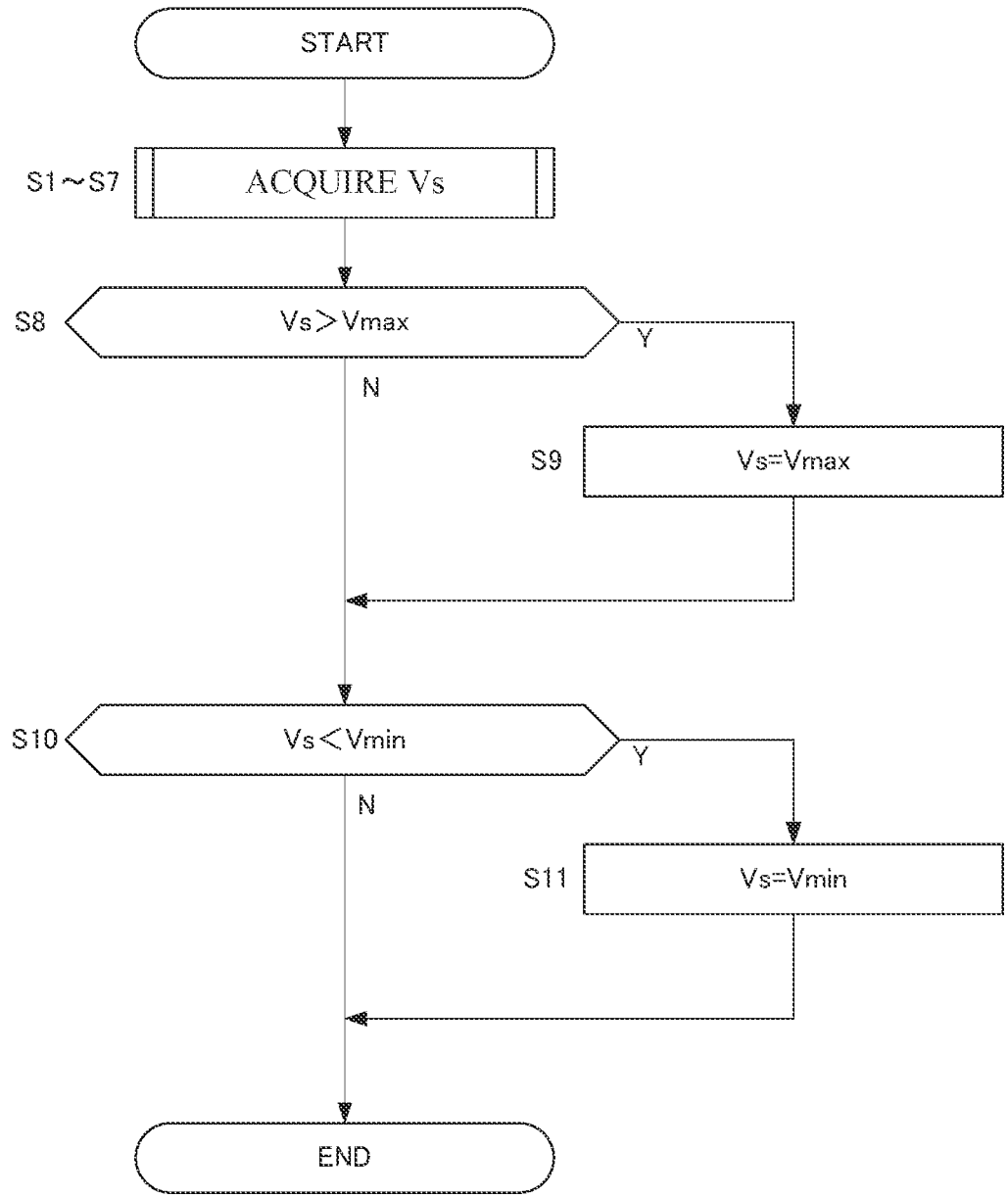
FIG. 10 is a flow chart concerning a modified example of this invention.

FIG. 10 is a flow chart concerning this modified example. In this modified example, step S1 to step S7 are the same as those in the foregoing embodiment. The configuration in this modified example has following step S8 to step S11. Each step will be described hereinafter.

<Vmax Comparing Step S8>

The computer for analysis or the main controller 11 compares the adjusted voltage Vs acquired and the upper limit voltage Vmax of the adjustable range of head drive voltages. When the adjusted voltage Vs exceeds the upper limit voltage Vmax, the operation proceeds to step S9. When the adjusted voltage Vs is equal to or less than the upper limit voltage Vmax, the operation proceeds to step S10.

<Vmax Setting Step S9>

The computer for analysis or the main controller 11 resets the adjusted voltage Vs to the upper limit voltage Vmax. This measure can reliably fit the adjusted voltage Vs within the adjustable range. Considering that the adjustable range represents a range of head drive voltages that can permit the quality of printing, when performing printing with the adjusted voltage Vs, the quality of printing result can be permitted. Alternatively, it is also possible to change the density at the time of setting the upper limit voltage Vmax to the target density TD, and make the densities of the other heads conform to the target density TD.

<Vmin Comparing Step S10>

The computer for analysis or the main controller 11 compares the adjusted voltage Vs acquired and the lower limit voltage Vmin of the adjustable range of head drive voltages. When the adjusted voltage Vs is less than the lower limit voltage Vmin, the operation proceeds to step S11. When the adjusted voltage Vs is equal to or higher than the lower limit voltage Vmin, the operation is ended.

<Vmin Setting Step S11>

The computer for analysis or the main controller 11 resets the adjusted voltage Vs to the lower limit voltage Vmin. This measure can reliably fit the adjusted voltage Vs within the adjustable range. Considering that the adjustable range represents a range of head drive voltages that can permit the quality of printing, when performing printing with the adjusted voltage Vs, the quality of printing result can be permitted. Alternatively, it is also possible to change the density at the time of setting the lower limit voltage Vmin to the target density TD, and make the densities of the other heads conform to the target density TD.

Figure 11:
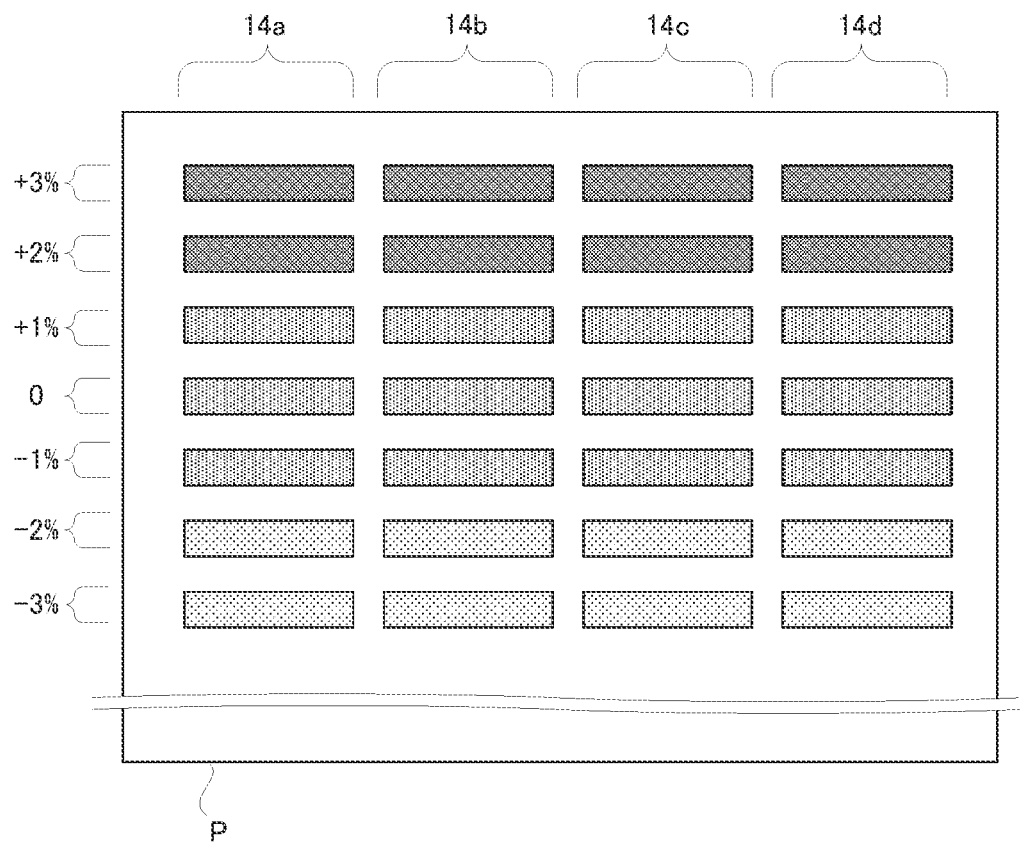
FIG. 11 is a schematic view illustrating a modified example of this invention.

(2) According to the construction of the foregoing embodiment, a test chart has printed thereon three patches per head, but more patches may be printed. In the example of FIG. 11, seven patches have been printed per head on a test chart while changing the amounts of variations of voltage by 1% each. By increasing the number of the patches per head in this way, approximate expressions can be calculated more accurately.

Figure 12:
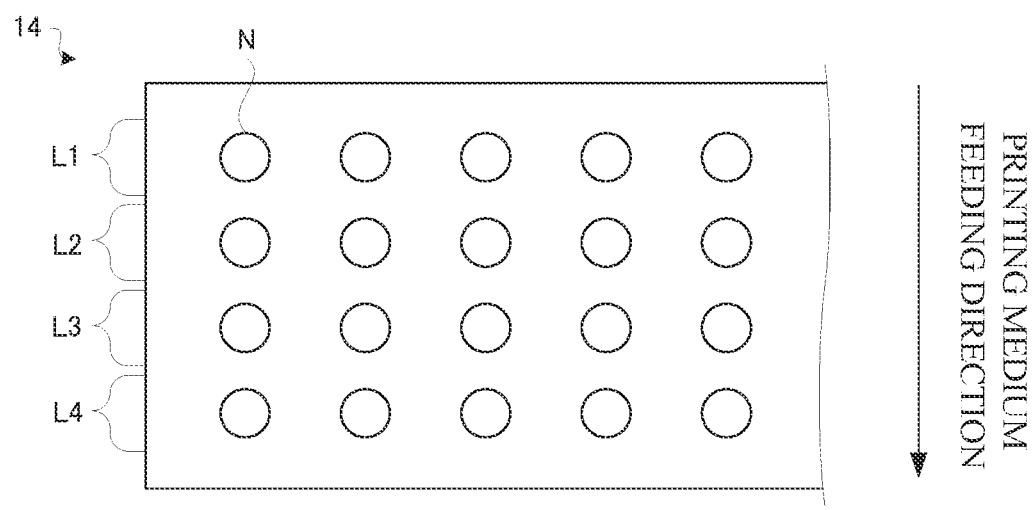
FIG. 12 is a schematic view illustrating a modified example of this invention.

(3) According to the construction of the foregoing embodiment, the adjusted voltages Vs are determined in units of heads 14*a*, 14*b*, 14*c* and 14*d*. However, this invention is not limited to this construction. A plurality of adjusted voltages Vs may be determined per head. As shown in FIG. 12, a head 14 has a plurality of nozzles arranged in a matrix pattern. That is, the head 14 has nozzle arrays L1, L2, L3 and L4 perpendicular to a feeding direction of the printing medium, which are arranged in the feeding direction of the printing medium. In this modified example, an adjusted voltage Vs is determined for each of the nozzle arrays L1, L2, L3 and L4. In the case of this modified example, the EEPROM needs to hold the reference voltage V0 for each of the nozzle arrays L1, L2, L3, and L4. When creating the test chart, it is necessary to print three patches regarding the lower limit voltage Vmin, reference voltage V0, and upper limit voltage Vmax per nozzle array. That is, one patch is formed as a result of a nozzle group requiring an adjusted voltage Vs to be determined and having dispensed ink droplets. Further, the nozzle arrays L1 and L2 may be regarded as joined together to determine a single adjusted voltage Vs. In this case, the nozzle arrays L3 and L4 may also have a single adjusted voltage Vs.

(4) The printing modes are related to the types of ink in the foregoing embodiment, but the printing modes may be related to other printing conditions. When the printing modes are related to the types of voltage waveforms (drive waveforms) outputted from the head controller 13 to the heads 14*a*, 14*b*, 14*c* and 14*d* for controlling the heads, the printing mode 1, printing mode 2, printing mode 3 . . . will be prepared in response to the types of drive waveform A, drive waveform B, drive waveform C . . . . In this case also, the memory 15 stores a table of the lower limit set values Smin and upper limit set values Smax related to the printing modes as illustrated in FIG. 4, and an adjusted voltage Vs is determined for each of the heads 14*a* 14*b*, 14*c* and 14*d* accordingly. Further, the printing modes may be related to printing speeds instead of the drive waveforms, or the printing modes may be related to purposes of using prints. Here, the "purposes of using prints" may include printing with priority given to density and printing with priority given to characters, for example. The printing apparatus 10 has various printing modes available for the use purposes. This invention may provide a construction having tables of the printing modes, lower limit set values Smin, and upper limit set values Smax relating to the use purposes. Further, the printing modes may be related to ink viscosity, or the printing modes may be related to surface tensions of ink.

(5) As a further modified example of the modified example (4), the printing modes may be related to temperatures of the heads 14*a*, 14*b*, 14*c* and 14*d*, and more particularly temperatures the nozzle groups included in the heads 14*a*, 14*b*, 14*c* and 14*d*. Head temperature may be acquired from a thermistor belonging to each head. In this modified example, when printing is performed based on determined adjusted voltages Vs, the user does not need to set a printing mode using the console provided for the main controller 11. In this modified example, the main controller 11 may be constructed to change the printing modes automatically through the thermistors.

(6) In the foregoing embodiment, the tables T1 and T2 are held in the printing apparatus 10. This invention is not limited to this construction. One or both of the table T1 and table T2 may be held outside the printing apparatus 10. In this case, for example, a construction may have a device for holding the table(s) and the printing apparatus 10 placed in the same network, and the main controller 11 of the printing apparatus 10 may operate by reading the table(s) from an external apparatus such as a server.

REFERENCE SIGNS LIST

10 printing apparatus
11 main controller
12 printer controller
13 head controller
14 heads
15 memory
16 motor
17 heat roller

The invention claimed is:

1. An adjusting method for a printing apparatus which executes printing by dispensing ink droplets from a plurality of nozzle groups to a printing medium, the method comprising:
   a step of setting a printing mode concerning an adjustment of the nozzle groups; and
   a step of acquiring an adjustable range of drive voltages of the nozzle groups corresponding to the printing mode set based on a table of relationship between each printing mode and the adjustable range.

2. The adjusting method for the printing apparatus according to claim 1, comprising a step of determining an adjusted value of the drive voltage for each of the nozzle groups based on the adjustable range acquired.

3. The adjusting method for the printing apparatus according to claim 1, comprising a step of creating a test chart based on the adjustable range acquired.

4. The adjusting method for the printing apparatus according to claim 3, comprising a step of acquiring a relationship between printing density and the drive voltages based on the test chart.

5. The adjusting method for the printing apparatus according to claim 1, wherein the printing mode corresponds to a type of ink.

6. The adjusting method for the printing apparatus according to claim 1, wherein the printing mode corresponds to a purpose of using prints.

7. The adjusting method for the printing apparatus according to claim 1, wherein the printing mode corresponds to a voltage waveform in time of driving the nozzle groups.

8. The adjusting method for the printing apparatus according to claim 1, wherein the printing mode corresponds to a speed of printing.

9. The adjusting method for the printing apparatus according to claim 1, wherein the printing mode corresponds to a temperature of the nozzle groups.

10. The adjusting method for the printing apparatus according to claim 1, wherein the printing mode corresponds to viscosity of the ink.

11. A printing apparatus for executing printing by dispensing ink droplets to a printing medium, comprising:
    nozzle groups having nozzles for dispensing the ink droplets, and executing printing by dispensing the ink droplets to the printing medium;
    a printing mode setter for setting printing modes concerning adjustment of the nozzle groups; and
    an adjustable range setter for acquiring an adjustable range of drive voltages of the nozzle groups corresponding to the printing mode set, based on a table of relationship between each printing mode and the adjustable range.

12. The printing apparatus according to claim 11, comprising a table memory for storing the table.

13. The adjusting method for the printing apparatus according to claim 2, comprising a step of creating a test chart based on the adjustable range acquired.

* * * * *